United States Patent
Song et al.

(10) Patent No.: US 10,970,532 B1
(45) Date of Patent: Apr. 6, 2021

(54) SYSTEMS AND METHODS FOR PREVENTING SHARING OF SENSITIVE CONTENT IN IMAGE DATA ON A CLOSED COMPUTING PLATFORM

(71) Applicant: CA, INC., San Jose, CA (US)

(72) Inventors: QuBo Song, Playa Vista, CA (US); Joseph Chen, Culver City, CA (US); Oksoon Jeong, Singapore (SG); Zhe Liu, Singapore (SG); Chris Houston, Toronto (CA)

(73) Assignee: CA, Inc., San Jose, CA (US)

( * ) Notice: Subject to any disclaimer, the term of this patent is extended or adjusted under 35 U.S.C. 154(b) by 127 days.

(21) Appl. No.: 16/433,691

(22) Filed: Jun. 6, 2019

(51) Int. Cl.
*G06K 9/00* (2006.01)
*H04L 12/24* (2006.01)
*H04L 29/06* (2006.01)
*G06N 20/00* (2019.01)

(52) U.S. Cl.
CPC ......... *G06K 9/00456* (2013.01); *G06N 20/00* (2019.01); *H04L 41/28* (2013.01); *H04L 63/0245* (2013.01)

(58) Field of Classification Search
None
See application file for complete search history.

(56) References Cited

U.S. PATENT DOCUMENTS

| | | | | |
|---|---|---|---|---|
| 8,572,758 | B1* | 10/2013 | Clifford | G06F 21/6218 726/30 |
| 8,856,869 | B1* | 10/2014 | Brinskelle | G06F 21/6218 726/2 |
| 10,079,835 | B1* | 9/2018 | Dodke | G06F 21/6245 |
| 2016/0070905 | A1* | 3/2016 | Antoun | G06F 21/6209 726/1 |
| 2018/0227326 | A1* | 8/2018 | Shavro | H04L 67/34 |
| 2020/0175152 | A1* | 6/2020 | Xu | G06F 21/14 |
| 2020/0404019 | A1* | 12/2020 | Drake | H04L 9/3226 |

* cited by examiner

*Primary Examiner* — Fayyaz Alam
(74) *Attorney, Agent, or Firm* — FisherBroyles, LLP (57) ABSTRACT

The disclosed computer-implemented method for preventing sharing of sensitive content in image data on a closed computing platform may include (i) detecting initiation of a network connection for sending network traffic data to a data storage service on the closed computing platform, (ii) monitoring the sending of the network traffic data to identify a target traffic indicator associated with image data, (iii) interrupting the sending of the network traffic data upon identifying the target traffic indicator, (iv) analyzing the image data to identify sensitive content, and (v) performing a security action that protects against the sensitive content being shared to the data storage service on the closed computing platform. Various other methods, systems, and computer-readable media are also disclosed.

20 Claims, 7 Drawing Sheets

SYSTEMS AND METHODS FOR PREVENTING SHARING OF SENSITIVE CONTENT IN IMAGE DATA ON A CLOSED COMPUTING PLATFORM

BACKGROUND

Security features associated with protecting data on enterprise and consumer computing devices may often be enforced by monitoring file events for files stored in various system folders utilized by an open device operating system or open computing system platform. For example, third-party software running on an open computing system platform may be configured to access a device file system to monitor file events in a system folder storing photographic image files and provide various security options to a user such as designating certain image files as private or maintaining image files only on the device instead of uploading them to a cloud service.

The security features provided by traditional software configured for use on open computing system platforms however, are unusable on computing devices utilizing closed computing platforms that may include policies restricting third-party access to device file systems. As a result, a number of the aforementioned security features, such as real-time protection of sensitive image files, are unavailable thereby potentially compromising computer device security.

SUMMARY

As will be described in greater detail below, the present disclosure describes various systems and methods for preventing sharing of sensitive content in image data on a closed computing platform.

In one example, a method for preventing sharing of sensitive content in image data on a closed computing platform may include (i) detecting initiation of a network connection for sending network traffic data to a data storage service on the closed computing platform, (ii) monitoring the sending of the network traffic data to identify a target traffic indicator associated with image data, (iii) interrupting the sending of the network traffic data upon identifying the target traffic indicator, (iv) analyzing the image data to identify sensitive content, and (v) performing a security action that protects against the sensitive content being shared to the data storage service on the closed computing platform.

In some examples, the initiation of the network connection may be detected by (i) detecting an event including a real-time capture of the image data by an image capture application and (ii) detecting the initiation of the network connection subsequent to the event. In some embodiments, the sending of the network traffic data may be monitored by examining the network traffic data to identify data including the target traffic indicator from among other data in the network traffic data.

In some examples, the image data may be analyzed to identify the sensitive content by querying an application programming interface (API) to determine that the image data includes the sensitive content. In some embodiments, the API may determine that the image data includes the sensitive content by utilizing a machine-learning model configured to detect one or more user-defined sensitive content categories.

In some examples, the security action may include (i) copying an original version of the image data comprising the sensitive content to a private sandbox and (ii) deleting the original version of the image data including the sensitive content from an image album on one or more computing devices. Additionally or alternatively, the security action may include hiding the image data including the sensitive content from display in an image album on the one or more computing devices. Additionally or alternatively, the security action may include masking the image data including the sensitive content with new image data comprising non-sensitive content.

In some embodiments, the computer-implemented may further include resuming the sending of the network traffic data to the data storage service. In some examples, the image data may include a file storing a photographic image captured by one or more computing devices.

In one embodiment, a system for preventing sharing of sensitive content in image data on a closed computing platform may include at least one physical processor and physical memory that includes a group of modules and computer-executable instructions that, when executed by the physical processor, cause the physical processor to (i) detect, by a detection module, initiation of a network connection for sending network traffic data to a data storage service on the closed computing platform, (ii) monitor, by a monitoring module, the sending of the network traffic data to identify a target traffic indicator associated with the image data, (iii) interrupt, by an interrupt module, the sending of the network traffic data upon identifying the target traffic indicator, (iv) analyze, by an analysis module, the image data to identify the sensitive content, and (v) perform, by a security module, a security action that protects against the sensitive content being shared to the data storage service on the closed computing platform.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect initiation of a network connection for sending network traffic data to a data storage service on a closed computing platform, (ii) monitor the sending of the network traffic data to identify a target traffic indicator associated with image data, (iii) interrupt the sending of the network traffic data upon identifying the target traffic indicator, (iv) analyze the image data to identify sensitive content, and (v) perform a security action that protects against the sensitive content being shared to the data storage service on the closed computing platform.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for preventing sharing of sensitive content in image data on a closed computing platform. As will be described in greater detail below, the systems and methods described herein may monitor network traffic communicated by a computing device during a data backup operation (e.g., a cloud data backup) to a data storage service on a closed computing platform to detect images containing potentially sensitive content that a user does not wish to share. The images, which may include photography events captured in real-time by a user of the computing device, may be identified from other data in the network traffic data by a traffic indicator. Once the images have been identified, the systems and methods described herein may interrupt the backup operation so that the images may be analyzed to verify that they contain the sensitive content. Once the images containing the sensitive content have been identified, the systems and methods described herein may then prevent the undesired sharing of the images on a closed computing platform (e.g., by removing them from the network traffic data for the backup operation and saving them to a private sandboxed data storage). In this way, the systems and methods described herein may overcome the drawbacks of closed computing platforms that restrict access to client file systems thereby preventing event-based detection for data files.

In addition, the systems and methods described herein may improve the security of a computing device utilized in closed computing platforms by preventing the sharing of image data containing sensitive content to network backup services and/or with users other than a primary user of the computing device associated with the sensitive content.

Figure 1:
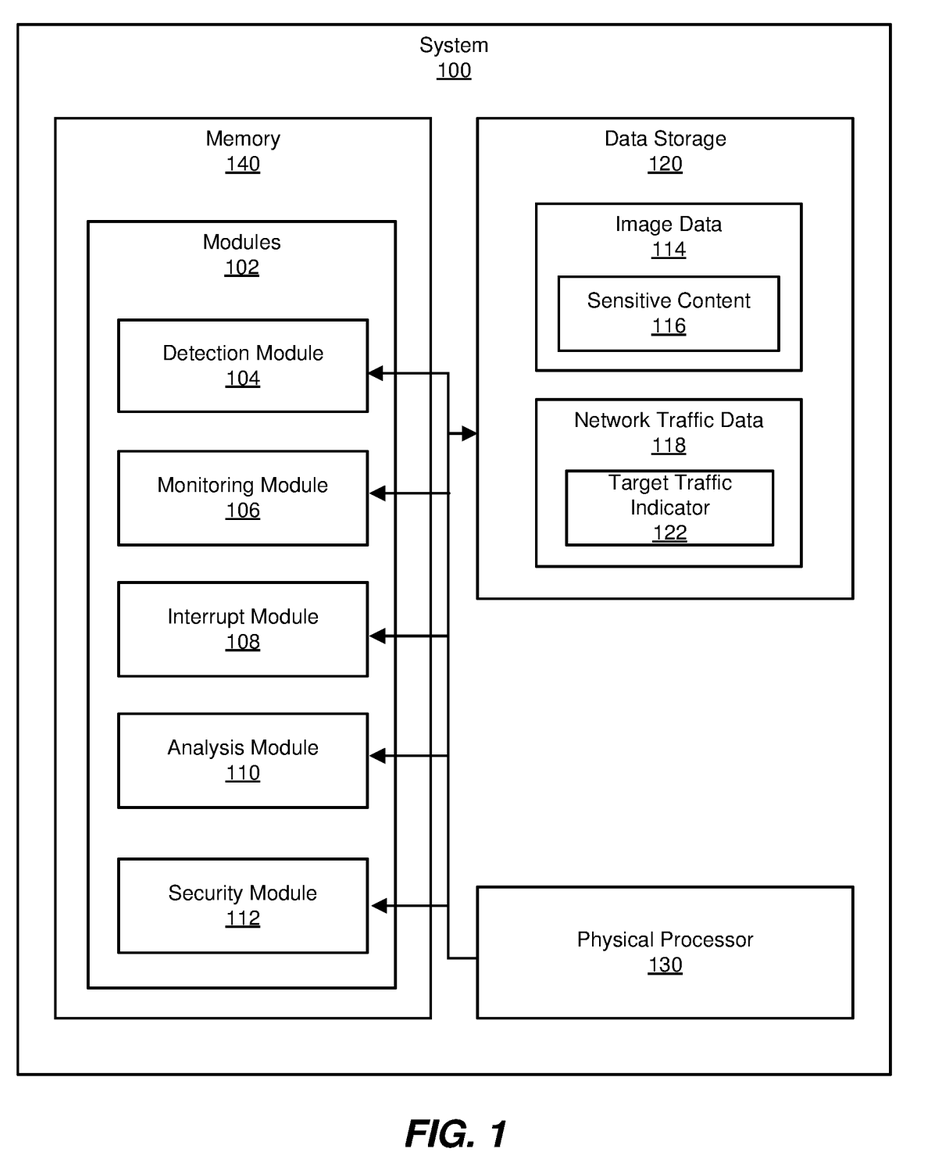
FIG. 1 is a block diagram of an example system for preventing sharing of sensitive content in image data on a closed computing platform.
Figure 2:
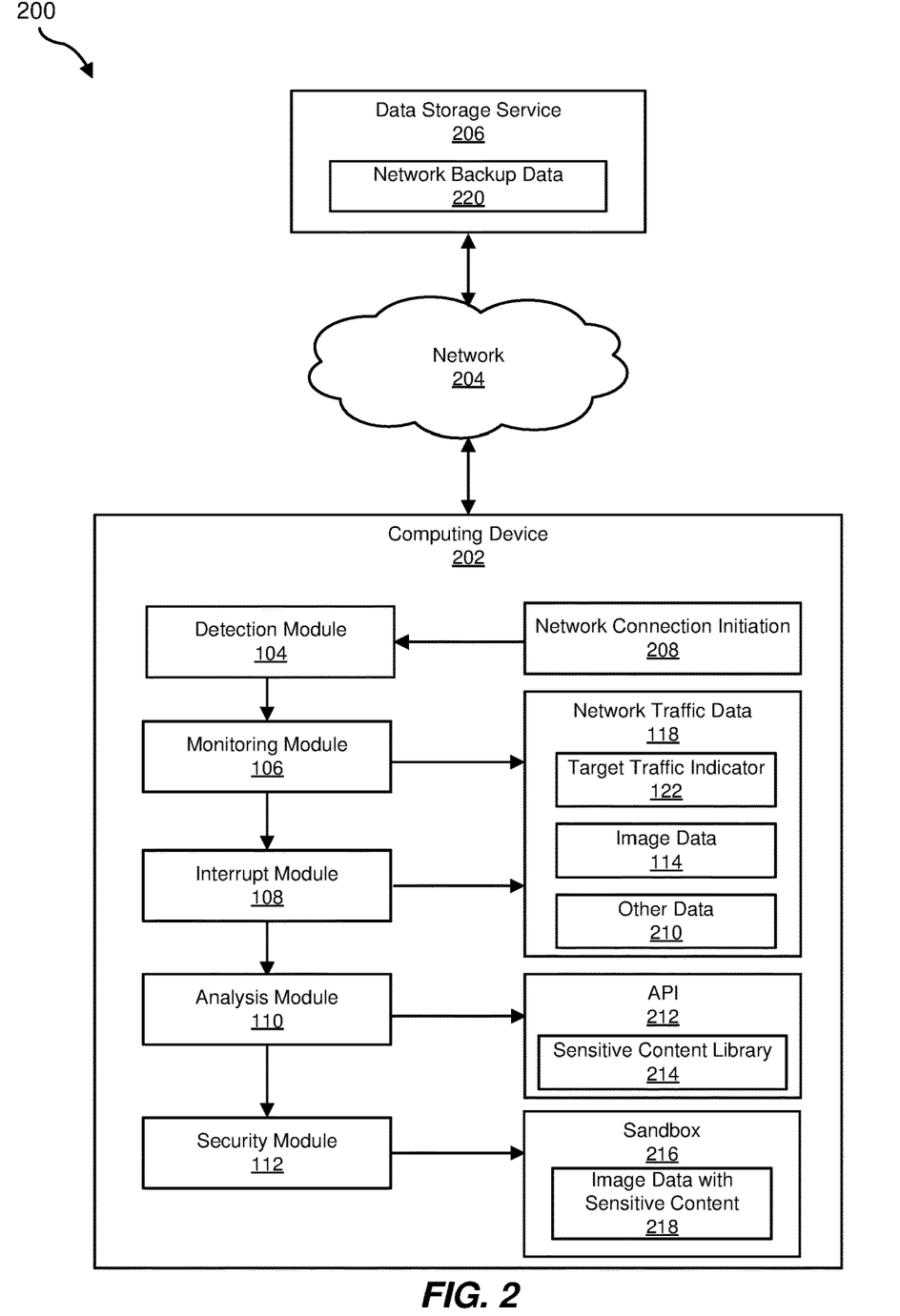
FIG. 2 is a block diagram of an additional example system for preventing sharing of sensitive content in image data on a closed computing platform.

The following will provide, with reference to FIGS. 1-2, detailed descriptions of example systems for preventing sharing of sensitive content in image data on a closed computing platform. Detailed descriptions of corresponding computer-implemented methods will also be provided in connection with FIG. 3. Detailed descriptions of example user interfaces generated by an example system for preventing sharing of sensitive content in image data on a closed computing platform, will also be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of an example system 100 for preventing sharing of sensitive content in image data on a closed computing platform. As illustrated in this figure, example system 100 may include one or more modules 102 for performing one or more tasks. As will be explained in greater detail below, modules 102 may include a detection module 104 that detects the initiation of a network connection for sending network traffic data to a data storage service on a closed computing platform. Example system 100 may additionally include a monitoring module 104 that monitors the sending of the network traffic data to identify a target traffic indicator associated with image data. Example system 100 may also include an interrupt module 108 that interrupts the sending of the network traffic data upon identifying the target traffic indicator. Example system 100 may additionally include an analysis module 110 that analyzes the image data to identify sensitive content. Example system 100 may also include a security module 112 that protects against the sensitive content being shared to the data storage service on the closed computing platform. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing sharing of sensitive content in image data on a closed computing platform. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example data storage 120 may store image data 114 and network traffic data 118. In some examples, image data 114 may include one or more image files containing photographic images captured in real-time by a mobile computing device. Additionally, one or more of the image files in image data 114 may contain sensitive content 116 (e.g., content which a user may not wish to be uploaded to a backup server and/or share with others). In some examples, network traffic data 118 may include a target traffic indicator 122 utilized for identifying image data 114 among other data traffic communicated over a network connection to a data storage service (e.g., a cloud backup service).

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a data storage service 206 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to prevent the sharing of sensitive content in image data on a closed computing platform.

For example, detection module 104 may detect a network connection initiation 208 for sending data on computing device 202 to a data storage service 206 in a network backup operation for remotely storing the data as network backup data 220. Then, monitoring module 106 may monitor network traffic data 118 as it is being sent to data storage service 206, to identify target traffic indicator 122 associated with image data 114. Network traffic data 118 may include image data 114 as well as other data 210. Next, interrupt module 108 may interrupt the sending of network traffic data 118 upon identifying target traffic indicator 122. Then, analysis module 110 may analyze image data 114 to identify sensitive content (e.g., by utilizing API 212 to determine whether content contained image data 114 corresponds to content in sensitive content library 214). Finally, security module 112 may perform a security action that protects against image data with sensitive content 218 from to data storage service 206 by saving image data with sensitive content 218 in a sandbox 216.

Computing device 202 generally represents any type or form of computing device capable of reading computer-executable instructions. In some examples, computing device 202 may be a mobile computing device with camera functionality utilized for capturing, storing, and initiating a backup of photographic images to a remote data storage service. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Data storage service 206 generally represents any type or form of computing device that is capable of storing data from one or more client computing devices (e.g., computing device 202) over a network connection. In some examples, data storage service 206 may be a cloud backup server on a closed computing platform configured to perform automatic backups of new image files (e.g., photographs) captured by a camera associated with computing device 202. Additional examples of data storage service 206 include, without limitation, security servers, application servers, web servers, storage servers, and/or database servers configured to run certain software applications and/or provide various security, web, storage, and/or database services. Although illustrated as a single entity in FIG. 2, data storage service 206 may include and/or represent a plurality of servers that work and/or operate in conjunction with one another.

Network 204 generally represents any medium or architecture capable of facilitating communication or data transfer. In one example, network 204 may facilitate communication between computing device 202 and data storage service 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
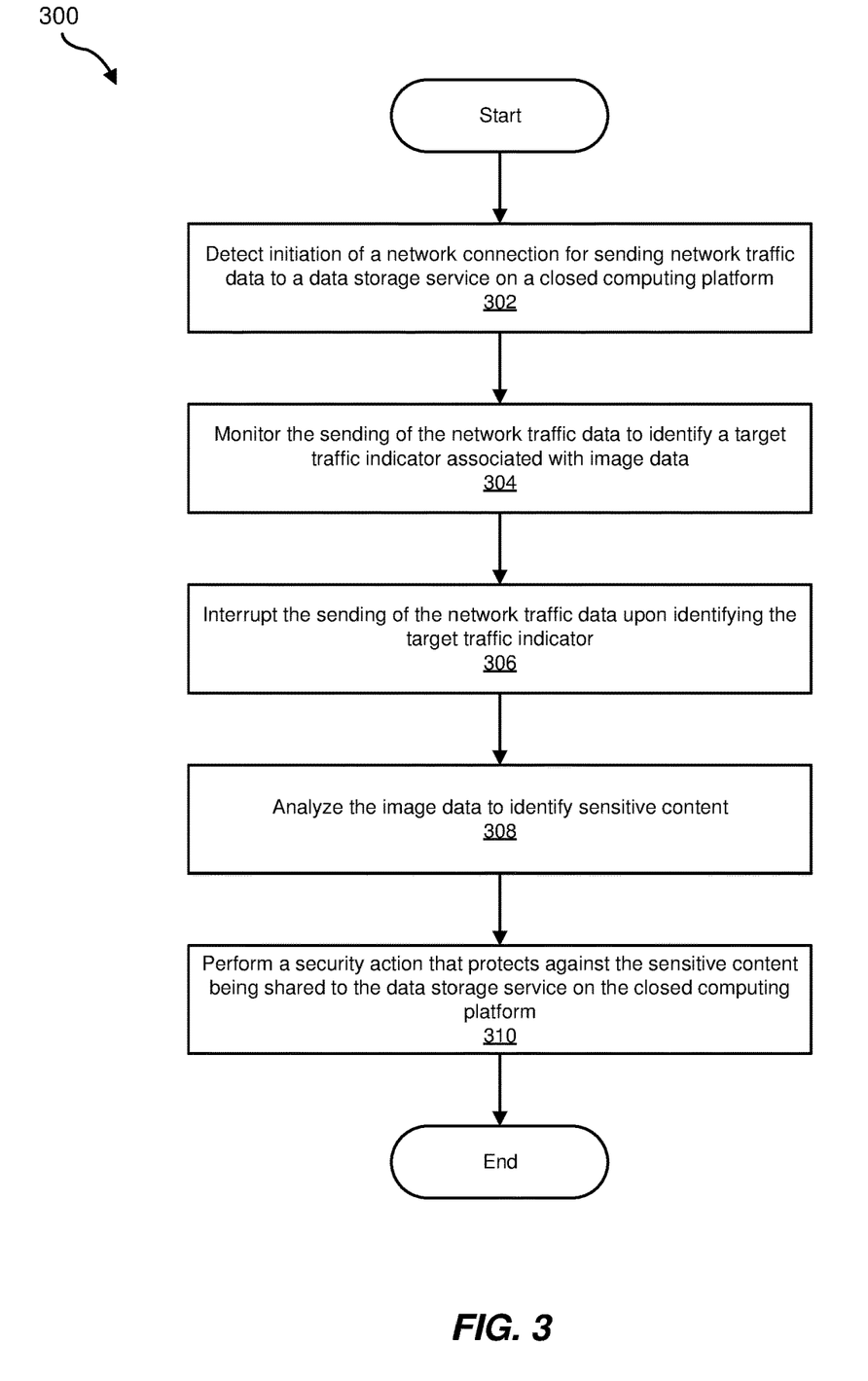
FIG. 3 is a flow diagram of an example method for preventing sharing of sensitive content in image data on a closed computing platform.

FIG. 3 is a flow diagram of an example computer-implemented method 300 for preventing sharing of sensitive content in image data on a closed computing platform. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect initiation of a network connection for sending network traffic data to a data storage service in a closed computing network. For example, detection module 104 may, as part of computing device 202 in FIG. 2, detect network connection initiation 208 for sending network traffic data 118 to data storage service 206 in a closed computing platform.

The term "network traffic," as used herein, generally refers to any communication for sending data over a network from one or more computing devices. For example, a client computing device may send a communication including image data, document data, application data, and/or other data over a network connection to a server computing device during a data backup operation for the client computing device. In some examples, the network connection may be a transport layer security (TLS) connection utilized in providing secure communications between client and server computing devices.

The term "image data," as used herein, generally refers to any type of data representing an image (i.e., depiction) of a subject or object captured by a computing device. For example, image data may include a photograph, screenshot, or other two-dimensional picture of a human subject and/or a physical object captured by a computing device and stored as a file thereon.

The term "data storage service," as used herein, generally refers to any service utilized for performing various tasks associated with storing data for one or more computing devices in a network. For example, a data storage service may include one or more remote cloud servers for performing backup data storage (e.g., documents, photographs, music, etc.), data sharing (e.g., sending data to multiple users of one or more computing devices), and data management tasks.

The term "closed computing platform," as used herein, generally refers to any hardware and software platform that restricts access to certain functionality and/or application access on computing devices where the platform is deployed. For example, a closed computing platform may include an operating system in which applications providing certain functionality (e.g., file system access) are sandboxed as a control or security measure, thereby preventing access and/or modification by outside or third-party applications.

Detection module 104 may detect network connection initiation 208 in a variety of ways. In some embodiments, detection module 104 may detect an event including a real-time capture of image data 114 by an image capture application and then detect network connection initiation 208 based on the event. For example, the event may include a user of computing device 202 utilizing an image capture application (e.g., a camera application) to take a photo of an item of interest which is then immediately saved to a folder as image data 114 on computing device 202. In response to the detection of the event, the computing device 202 (based on rules associated with an operating system running on the closed computing platform) may automatically initiate a network connection, which is detected by detection module 104, to send the photo in image data 114 to data storage service 206 as backup data. In some examples, detection module 104 may be deployed as part of a component running as a background service for detecting and monitoring network traffic communicated over closed computing platforms, on computing device 202.

At step 304, one or more of the systems described herein may monitor the sending of network traffic data to identify a target traffic indicator associated with image data. For example, monitoring module 106, may, as part of computing device 202 in FIG. 2, monitor network traffic data 118 to identify target traffic indicator 122 associated with image data 114. In some examples, monitoring module 106 may be deployed as part of a component running as a background service for detecting and monitoring network traffic communicated over closed computing platforms, on computing device 202.

Monitoring module 106 may monitor network traffic data 118 in a variety of ways. In some embodiments, monitoring module 106 may be configured to perform network traffic inspection (while running as a background service) to examine network traffic data 118 for data representing target traffic indicator 122 from among other data 210 in network traffic data 118. For example, monitoring module 106 may be configured to examine network traffic data 118 for data representing an image file format (e.g., JPEG, GIG, TIFF, BMP, PNG, etc.) to identify image data 114 from among other data 210 that may include, without limitation, application file format data.

At step 306, one or more of the systems described herein may interrupt the sending of the network traffic data upon identifying the target traffic indicator at step 304. For example, interrupt module 108, may, as part of computing device 202 in FIG. 2, interrupt the sending of network traffic data 118 to data storage service 206 upon identifying target traffic indicator 122 associated with the presence of image data 114.

Interrupt module 108 may interrupt the sending of network traffic data 118 in a variety of ways. For example, interrupt module 108 may intercept the communication of network traffic data 118 (including image data 114 and other data 210), thereby stopping the sending of network traffic data 118 to data storage service 206. Interrupt module 108 may then store the intercepted network traffic data 118 in a temporary data store for an analysis of image data 114 for sensitive content 116. In some examples, upon a failure of monitoring module 106 to identify target traffic indicator 122, interrupt module 108 may decline to intercept network traffic data 118 thereby allowing the sending of network traffic data 118 to continue, without interruption, to data storage service 206.

At step 308, one or more of the systems described herein may analyze the intercepted image data at step 308 to identify sensitive content. For example, analysis module 110, may, as part of computing device 202 in FIG. 2, analyze image data 114 to identify any sensitive content 116 contained therein.

The term "sensitive content," as used herein, generally refers to any images containing content that a user of a computing device does not wish to share (e.g., with other users of the computing device, users of other computing devices, and/or a cloud backup server). In some examples, sensitive content may include predetermined image categories specified by a user. For example, predetermined sensitive content image categories may include, without limitation, whiteboard images captured during meetings at the user's place of employment, family photographs, and photographs associated with private and public user activity (e.g., bars, clubs, wine bottles, etc.).

Analysis module 110 may analyze image data 114 a variety of ways. In some embodiments, analysis module 110 may query API 212 to determine whether image data 114 contains sensitive content 116. For example, API 212 may determine that image data 114 contains sensitive content 116 by utilizing a machine-learning model configured to detect one or more user-defined sensitive content categories in sensitive content library 214 (e.g., photographs associated with the user's place of employment or pre-defined personal activities (e.g., wine bottles, etc.).

At step 310, one or more of the systems described herein may perform a security action that protects against sensitive content identified at step 308 from being shared to the data storage service on the closed computing platform. For example, security module 112, may, as part of computing device 202 in FIG. 2, perform a security action that protects against sensitive content 116 from being shared to data storage service 206 on the closed computing platform.

Security module 112 may protect against the sharing of sensitive content 116 in a variety of ways. In some examples, security module 112 may copy an original version of image data 114 containing sensitive content 116 (i.e., image data with sensitive content 218) to sandbox 216. In one embodiment, sandbox 216 may be a private sandbox application for storing image files on computing device 202. Then, security module 112 may delete the original version of image data 114 containing sensitive content 116 from the image album on computing device 202 where image data 114 was stored after being captured in real-time by a user of computing device 202. Additionally or alternatively, security module 112 may protect against the sharing of sensitive content 116 by hiding image data 114 with sensitive content 116 from display in an image album on computing device 202. Additionally or alternatively, security module 112 may protect against the sharing of sensitive content 116 by masking image data 114 with sensitive content 116 with new image data consisting of non-sensitive content. In some examples, security module 112 may further, after protecting against the sharing of sensitive content 116, may initiate the resumption of the sending of network traffic data 118 to data storage service 206. For example, security module 112 may be configured to instruct interrupt module 108 to resend network traffic data 118, including a protected version of image data 114 from the image album on computing device 202 but not including the copy of image data 114 with sensitive content 116 (i.e., image data with sensitive content 218) stored in sandbox 216. Thus, when network traffic data 118 is received by data storage service 206, sensitive content 116 will not be stored by data storage service 206. When a user requests to view the image data with sensitive content 218 stored in sandbox 216, security module 112 may further be configured to render it solely within sandbox 216 for viewing by the user.

Figure 4:
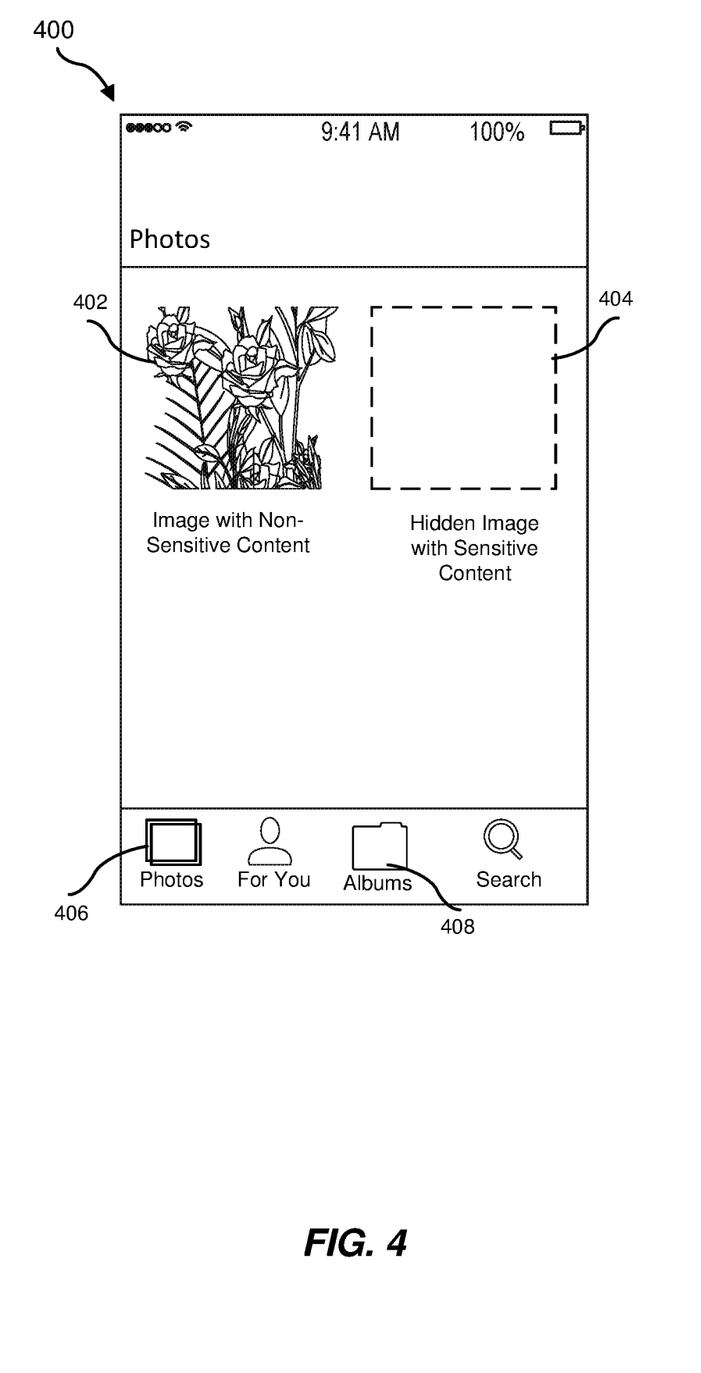
FIG. 4 is a block diagram of an example user interface generated by an example system for preventing sharing of sensitive content in image data on a closed computing platform.

FIG. 4 is an example user interface 400 generated by an example system for preventing sharing of sensitive content in image data on a closed computing platform. The example user interface 400 may include a group of photos 406 in an image album 408. The photos 406 may include a photo 402 (i.e., flowers) displaying an image with non-sensitive content and a placeholder 404 indicating an image with sensitive content has been hidden from display in image album 408.

In some examples, placeholder 404 may be shown as blank space where a photo would typically be displayed in image album 408 thereby visibly alerting a user that a copy of the original image including the sensitive content has been stored in sandbox 216 of FIG. 2. Additionally or alternatively, placeholder 404 may be displayed as a photo border without any content displayed therein.

Figure 5:
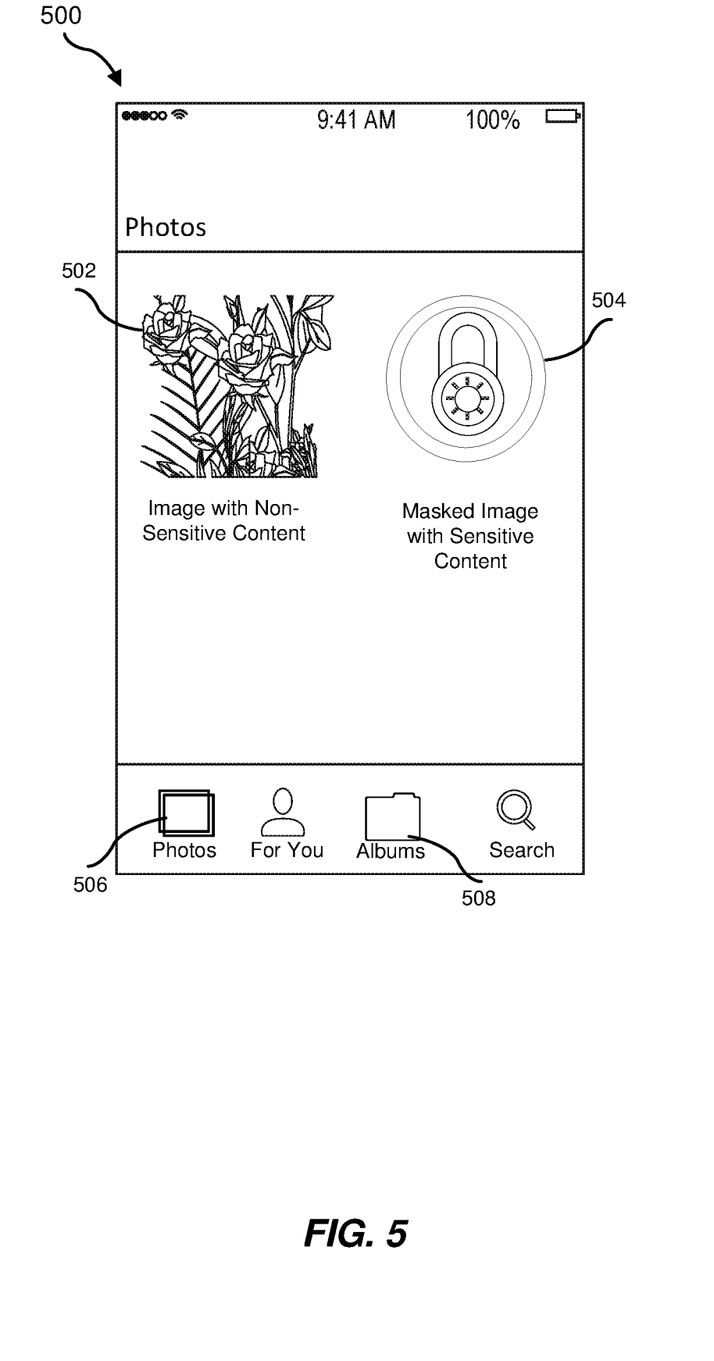
FIG. 5 is a block diagram of an additional example user interface generated by an example system for preventing sharing of sensitive content in image data on a closed computing platform.

FIG. 5 is an additional example user interface 500 generated by an example system for preventing sharing of sensitive content in image data on a closed computing platform. The example user interface 500 may include a group of photos 506 in an image album 508. The photos 506 may include a photo 502 (i.e., flowers) displaying an image with non-sensitive content and a masked image 504 (e.g., a lock symbol) indicating an image with sensitive content has been masked in the image album 408.

In some examples, masked image 504 may be a predetermined image applied to all images with sensitive content that have been protected by security module 112 of FIG. 2 and stored in sandbox 216. In other examples, masked image 504 may be a randomly generated image known to contain non-sensitive content (e.g., a user-selected image), for visibly alerting a user that the original image including the sensitive content has been stored in sandbox 216 of FIG. 2.

As explained in connection with method 300 above, the systems and methods described herein provide for preventing the sharing of sensitive content in image data on a closed computing platform. By implementing and deploying a security application including a cross-platform network detection component, the systems described herein may provide network traffic inspection, running as a reliable background service, to identify the initiation of a computing device communicating with a cloud service. When a target traffic indicator has been identified, the component may pause the communication to the cloud service thereby providing an opportunity for the processing of sensitive photographic images. The processing may include utilizing logic (e.g., machine-learning) to query an API for any new photographic images taken for determining whether any of the images contain sensitive content. Once a sensitive photographic image has been identified, the security application may provide several methods to protect against the sharing of the image including, without limitation, (i) copying the original photographic image to a private sandbox in the application and then deleting the original, (ii) calling the API to hide the original photographic image, and/or (iii) masking the original photographic image with a random image containing non-sensitive content. The security application may further provide, upon a user wishing to review the original photographic image, rendering the copy of the image within the private sandbox.

Figure 6:
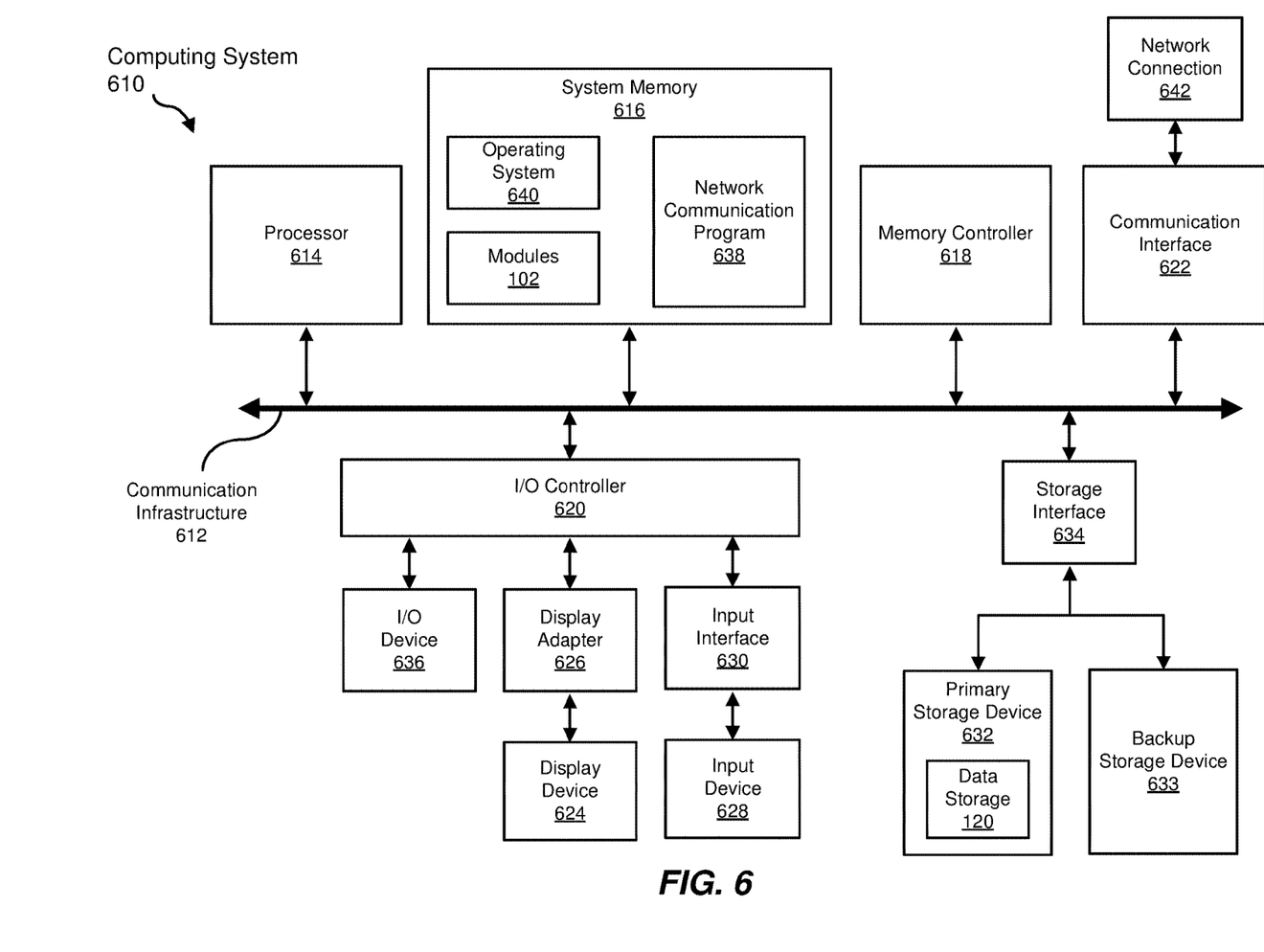
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
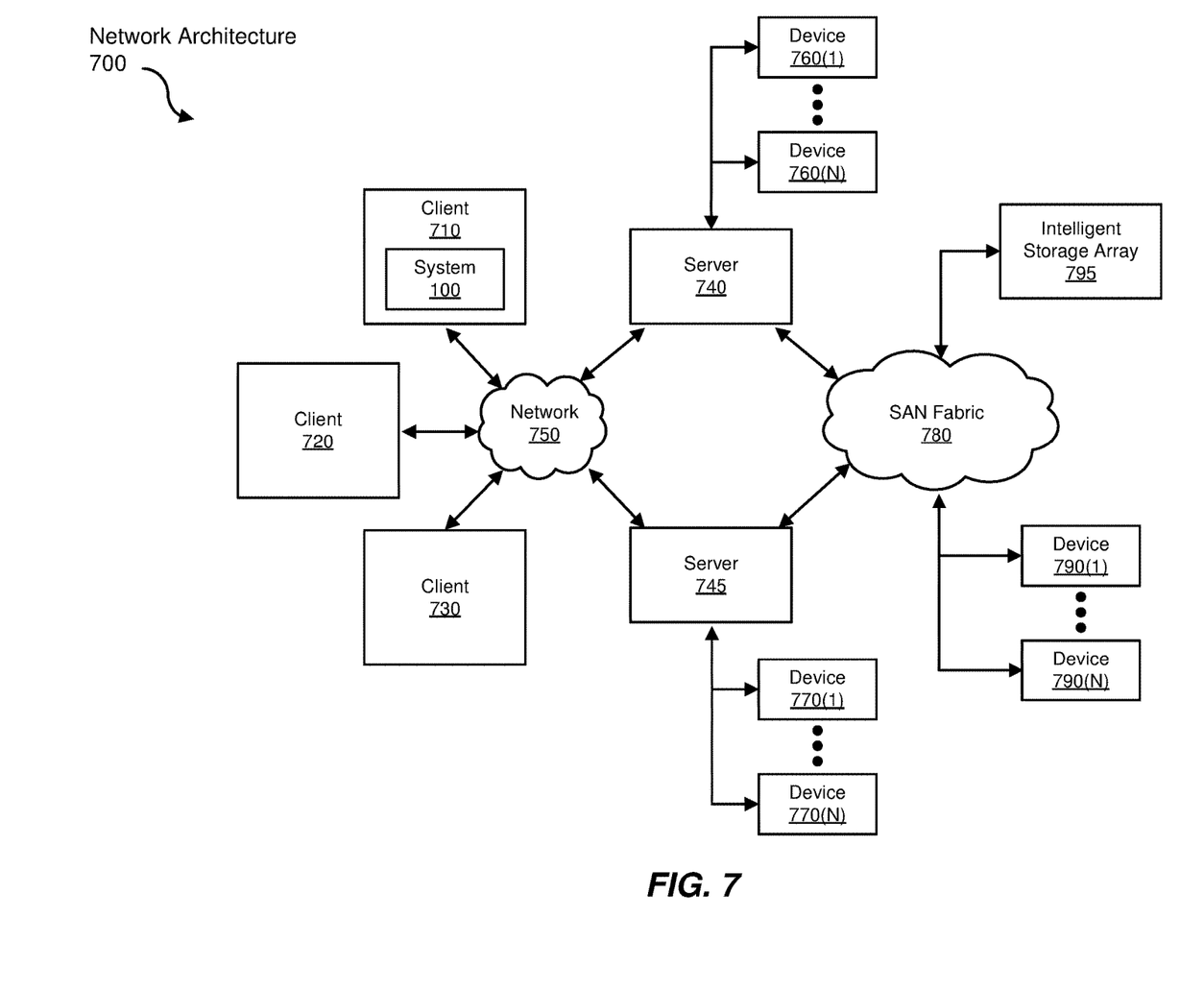
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing sharing of sensitive content in image data on a closed computing platform.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing sharing of sensitive content in image data on a closed computing platform, at least a portion of the method being performed by one or more computing devices comprising at least one processor, the method comprising:
   detecting, by the one or more computing devices, initiation of a network connection for sending network traffic data to a data storage service on the closed computing platform;
   monitoring, by the one or more computing devices, the sending of the network traffic data to identify a target traffic indicator associated with the image data;
   interrupting, by the one or more computing devices, the sending of the network traffic data upon identifying the target traffic indicator;
   analyzing, by the one or more computing devices, the image data to identify the sensitive content; and
   performing, by the one or more computing devices, a security action that protects against the sensitive content being shared to the data storage service on the closed computing platform.

2. The computer-implemented method of claim 1, wherein detecting the initiation of the network connection comprises:
   detecting an event comprising a real-time capture of the image data by an image capture application; and
   detecting the initiation of the network connection subsequent to the event.

3. The computer-implemented method of claim 1, wherein monitoring the sending of the network traffic data comprises examining the network traffic data to identify data comprising the target traffic indicator from among other data in the network traffic data.

4. The computer-implemented method of claim 1, wherein analyzing the image data to identify the sensitive content comprises querying an application programming interface (API) to determine that the image data comprises the sensitive content.

5. The computer-implemented method of claim 4, wherein the API determines that the image data comprises the sensitive content by utilizing a machine-learning model configured to detect one or more user-defined sensitive content categories.

6. The computer-implemented method of claim 1, wherein performing the security action comprises:
   copying an original version of the image data comprising the sensitive content to a private sandbox; and
   deleting the original version of the image data comprising the sensitive content from an image album on the one or more computing devices.

7. The computer-implemented method of claim 1, wherein performing the security action comprises hiding the image data comprising the sensitive content from display in an image album on the one or more computing devices.

8. The computer-implemented method of claim 1, wherein performing the security action comprises masking the image data comprising the sensitive content with new image data comprising non-sensitive content.

9. The computer-implemented method of claim 1, further comprising resuming the sending of the network traffic data to the data storage service.

10. The computer-implemented method of claim 1, wherein the image data comprises a file storing a photographic image captured by the one or more computing devices.

11. A system for preventing sharing of sensitive content in image data on a closed computing platform, the system comprising:
   at least one physical processor;
   physical memory comprising a plurality of modules and computer-executable instructions that, when executed by the physical processor, cause the physical processor to:
      detect, by a detection module, initiation of a network connection for sending network traffic data to a data storage service on the closed computing platform;
      monitor, by a monitoring module, the sending of the network traffic data to identify a target traffic indicator associated with the image data;
      interrupt, by an interrupt module, the sending of the network traffic data upon identifying the target traffic indicator;
      analyzing, by an analysis module, the image data to identify the sensitive content; and perform, by a security module, a security action that protects against the sensitive content being shared to the data storage service on the closed computing platform.

12. The system of claim 11, wherein the detection module detects the initiation of the network connection by:
    detecting an event comprising a real-time capture of the image data by an image capture application; and
    detecting the initiation of the network connection subsequent to the event.

13. The system of claim 11, wherein the monitoring module monitors the sending of the network traffic data by examining the network traffic data to identify data comprising the target traffic indicator from among other data in the network traffic data.

14. The system of claim 11, wherein analysis module analyzes the image data to identify the sensitive content by querying an application programming interface (API) to determine that the image data comprises the sensitive content.

15. The system of claim 14, wherein the API determines that the image data comprises the sensitive content by utilizing a machine-learning model configured to detect one or more user-defined sensitive content categories.

16. The system of claim 11, wherein the security module performs the security action by:
    copying an original version of the image data comprising the sensitive content to a private sandbox; and
    deleting the original version of the image data comprising the sensitive content from an image album on one or more computing devices on the closed computing platform.

17. The system of claim 11, wherein the security module performs the security action by hiding the image data comprising the sensitive content from display in an image album on one or more computing devices on the closed computing platform.

18. The system of claim 11, wherein the security module performs the security action by masking the image data comprising the sensitive content with new image data comprising non-sensitive content.

19. The system of claim 11, wherein the image data comprises a file storing a photographic image captured by one or more computing devices on the closed computing platform.

20. A non-transitory computer-readable medium comprising one or more computer-executable instructions that, when executed by at least one processor of a computing device, cause the computing device to:
    detect initiation of a network connection for sending network traffic data to a data storage service on a closed computing platform;
    monitor the sending of the network traffic data to identify a target traffic indicator associated with image data;
    interrupt the sending of the network traffic data upon identifying the target traffic indicator;
    analyze the image data to identify sensitive content; and
    perform a security action that protects against the sensitive content being shared to the data storage service on the closed computing platform.

\* \* \* \* \*